(No Model.)

F. TERSTEGEN.
BOW SPRING FOR EYEGLASSES.

No. 244,686. Patented July 19, 1881.

WITNESSES:
Chas. Nida
C. Sedgwick

INVENTOR:
F. Terstegen
BY
ATTORNEYS.

UNITED STATES PATENT OFFICE.

FRED TERSTEGEN, OF ELIZABETH, NEW JERSEY.

BOW-SPRING FOR EYEGLASSES.

SPECIFICATION forming part of Letters Patent No. 244,686, dated July 19, 1881.

Application filed January 17, 1881. (No model.)

*To all whom it may concern:*

Be it known that I, FRED TERSTEGEN, of Elizabeth, in the county of Union and State of New Jersey, have invented a new and Improved Spring for Eyeglasses, of which the following is a specification.

The object of my invention is to provide a new and improved eyeglass which can be closed without contracting the spring and without requiring one glass to pass along the other. The invention relates to eyeglasses with a divided bow-spring; and it consists in making the spring of a flat piece of steel and forming an extension on each section beyond the rivet, so that a corresponding projection and indentation may be made to lock the ends on both sides of the rivet. The two sections are thus held rigidly together when the glasses are in use, but will require but slight force to unlock them when they are to be folded together.

Figure 1:
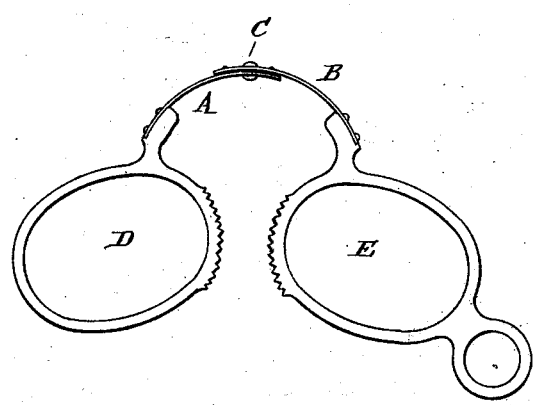
Figure 2:
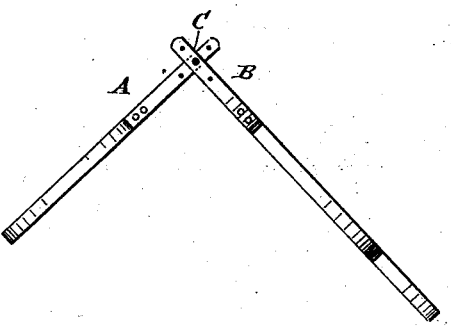
Figure 3:
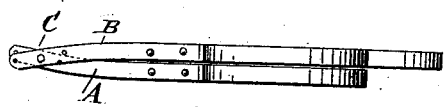
Figure 4:
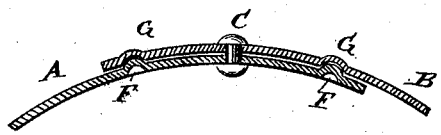

In the accompanying drawings, Figure 1 is a side view of an eyeglass provided with my improved hinged spring, the eyeglass being open. Fig. 2 is a plan view of the same, showing it half-closed. Fig. 3 is a plan view of the same, showing it entirely closed. Fig. 4 is a detail longitudinal sectional elevation through the middle of my improved hinged eyeglass-spring.

Similar letters of reference indicate corresponding parts.

The spring of the eyeglass is formed of two flat strips of spring-metal, A and B, which are pivoted to each other by a rivet or analogous device, C, which passes through the overlapping ends of these strips or extensions. Each spring-strip A or B is fastened to the frame of a glass, D or E, as shown, or they may be fastened directly to the glass as in case of frameless glasses. The ends of the strips A and B are provided with corresponding projections and recesses or notches F and G at each side of the pivot C. These projections and notches serve to hold the spring in position when the glass is open, and they may be replaced by any analogous device that will accomplish the same.

The operation is as follows: If the eyeglass is open, as shown in Fig. 1, the projections F F of the strip rest in the recesses or notches G G of the strip B, as shown in Fig. 4, and thus hold these two strips in one straight line. If the eyeglass is to be closed the pivot C will be the center of rotation, and the two glasses D and E will swing toward each other, as shown in Fig. 2, and will finally lie close against each other, as shown in Fig. 3. The eyeglass can thus be closed without contracting the spring, and the pins and hooks formerly required to lock the eyeglass in position when closed are no longer required. The within-described construction of the spring is applicable to any kind of spring-eyeglass, and will be of special advantage in those glasses having either plain or stationary nose-rests, for these nose-rests and the springs are very apt to be broken if the glass is closed as heretofore, but cannot be damaged if closed by swinging the glasses sidewise toward each other, as I have described above.

I am aware that the bow-spring of eyeglasses has been bisected, and the two sections so connected that one will turn on the other; but

What I claim is—

An eyeglass having the nose-piece or bow-spring jointed in the middle so as to permit the lenses to fold sidewise toward each other, and having the ends of the two sections of the nose-piece or bow-spring extended past the pivot and provided with locking devices for holding the same in position for use, substantially as described.

FRED TERSTEGEN.

Witnesses:
 OSCAR F. GUNZ,
 C. SEDGWICK.